United States Patent
Jo et al.

(10) Patent No.: US 11,729,749 B2
(45) Date of Patent: Aug. 15, 2023

(54) METHOD OF DETERMINING SLOT FORMAT IN WIRELESS COMMUNICATION SYSTEM AND APPARATUS THEREFOR

(71) Applicant: LG Electronics Inc., Seoul (KR)

(72) Inventors: Soonki Jo, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 17/096,492

(22) Filed: Nov. 12, 2020

(65) Prior Publication Data

US 2021/0068107 A1  Mar. 4, 2021

Related U.S. Application Data

(63) Continuation of application No. 16/815,602, filed on Mar. 11, 2020, now Pat. No. 10,869,311, which is a
(Continued)

(30) Foreign Application Priority Data

May 3, 2018  (KR) .................. 10-2018-0050945

(51) Int. Cl.
*H04W 72/0446* (2023.01)
*H04L 5/00* (2006.01)
*H04W 72/23* (2023.01)

(52) U.S. Cl.
CPC ....... *H04W 72/0446* (2013.01); *H04L 5/0003* (2013.01); *H04W 72/23* (2023.01)

(58) Field of Classification Search
CPC ..... H04L 5/003; H04L 5/0042; H04L 5/0082; H04L 5/0092; H04L 5/1469; H04W 72/042; H04W 72/0446
See application file for complete search history.

(56) References Cited

U.S. PATENT DOCUMENTS

2015/0003301 A1  1/2015  He et al.
2015/0245246 A1  8/2015  Elbwart
(Continued)

OTHER PUBLICATIONS

InterDigital Inc. "On configuration of GC-PDCCH for dynamic SFI"; 3GPP TSG RAN WG1 Meeting 91 Reno, USA, Nov. 27-Dec. 1, 2017; R1-1720637 (Year: 2017).*
(Continued)

*Primary Examiner* — Gary Mui
(74) *Attorney, Agent, or Firm* — Fish & Richardson P.C.

(57) ABSTRACT

A method performed by a user equipment (UE) in a wireless communication system, where the method includes: receiving, through higher layer signaling, uplink (UL)/downlink (DL) resource configuration including information regarding a first UL/DL resource pattern; determining, based on the received UL/DL resource configuration, the first UL/DL resource pattern that is applicable over a first configuration period; and based on the received UL/DL resource configuration also including information regarding a second UL/DL resource pattern: determining the second UL/DL resource pattern that is applicable over a second configuration period, wherein the first configuration period and the second configuration period are restricted to values such that an integer multiple of a sum of the first configuration period and the second configuration period is time-aligned with a 20 ms time duration.

16 Claims, 6 Drawing Sheets

Related U.S. Application Data continuation of application No. PCT/KR2019/001834, filed on Feb. 14, 2019.

(60) Provisional application No. 62/670,706, filed on May 11, 2018, provisional application No. 62/668,791, filed on May 8, 2018, provisional application No. 62/630,259, filed on Feb. 14, 2018.

(56) References Cited

U.S. PATENT DOCUMENTS

| | | | |
|---|---|---|---|
| 2016/0020891 A1 | 1/2016 | Jung et al. | |
| 2018/0279304 A1 | 9/2018 | Lee et al. | |
| 2019/0053227 A1* | 2/2019 | Huang | H04W 72/0446 |
| 2019/0191322 A1 | 6/2019 | Sun et al. | |
| 2019/0199422 A1 | 6/2019 | Li et al. | |
| 2019/0200351 A1* | 6/2019 | Sun | H04W 72/0446 |
| 2019/0245648 A1* | 8/2019 | Jo | H04W 72/0446 |
| 2019/0254024 A1* | 8/2019 | Nam | H04L 27/2602 |
| 2020/0374077 A1* | 11/2020 | Wang | H04W 72/0446 |
| 2021/0337510 A1* | 10/2021 | Shen | H04W 72/1289 |

OTHER PUBLICATIONS

3rd Generation Partnership Project, LG Electronics, "Discussion on group common PDCCH," R1-1800373, 3GPP TSG RAN WG1, Vancouver, Canada, dated Jan. 22-26, 2018, 15 pages.

3rd Generation Partnership Project, Qualcomm Incorporated, "Offline discussions on GC-PDCCH carrying SFI," 1801121, 3GPP TSG RAN WG1, Vancouver, Canada, dated Jan. 22-26, 2018, 13 pages.

Apple Inc.; "Slot Format Indicator in Group-common PDCCH"; 3GPP TSG-RAN WG1 NR#3 Prague, Czech, Oct. 9-13, 2017; R1-1717782 (Year: 2017).

CATT, Potevio; "Remaining details of slot format indication"; 3GPP TSG RAN WG1 Meeting AH 1801 Vancouver, Canada, Jan. 22-26, 2018; R1-1800250 (Year: 2018).

Intel Corporation; "Group-common PDCCH: U E behavior"; 3GPP TSG RAN WG1 N R Ad-Hoc#2 Qingdao, P.R. China Jun. 27-30, 2017; R1-1710549 (Year: 2017).

International Search Report in International Appln. No. PCT/KR2019/001834, dated Jun. 3, 2020, 21 pages.

NTT Docomo, Inc.; "Views on UE behavior for group-common PDCCH"; 3GPP TSG RAN WG1 NR Ad-Hoc#2 Qingdao, P.R. China Jun. 27-30, 2017; R1-1711096 (Year: 2017).

Qualcomm Incorporated; "Remaining issues on slot format indication"; 3GPP TSG RAN WG1 Meeting AH 1801 Vancouver, Canada, Jan. 22-26, 2018; R1-1800869 (Year: 2018).

Sharp; "Slot format determination in NR"; 3GPP TSG RAN WG1 Meeting #AH 1801 Vancouver, Canada, Jan. 22-26, 2018; R1-1800612 (Year: 2018).

Vivo; "Remaining issues on slot format and GC-PDCCH"; 3GPP TSG RAN WG1 Meeting AH 1801 Vancouver, Canada, Jan. 22-26, 2018; R1-1800197 (Year: 2018).

ZTE, Sanechips; "Additional periodicity values for N R signals/channels"; 3GPP TSG RAN WG1 Meeting AH 1801 Vancouver, Canada, Jan. 22-26, 2018; R1-1800554 (Year: 2018).

ZTE, Sanechips; "Remaining issues for slot format"; 3GPP TSG RAN WG1 Meeting AH 1801 Vancouver, Canada, Jan. 22-26, 2018; R1-1800992 (Year: 2018).

ZTE, Sanechips; "Remaining issues for slot format"; 3GPP TSG RAN WG1 Meeting AH 1801 Vancouver, Canada, Jan. 22-26, 2018; R 1-1800131 (Year: 2018).

Ericsson, "On remaining issues of GC-PDCCH," R1-1802904, Presented at 3GPP TSG-RAN WG1 #92, Athens, Greece, Feb. 26-Mar. 2, 2018, 6 pages.

LG Electronics, "Remaining issues on group common PDCCH," R1-1804552, Presented at 3GPP TSG RAN WG1 #92 bis, Sanya, China, Apr. 16-20, 2018, 9 pages.

Office Action in Japanese Appln. No. 2021-214960, dated Dec. 20, 2022, 5 pages (with English translation).

\* cited by examiner

— Prior Art —

METHOD OF DETERMINING SLOT FORMAT IN WIRELESS COMMUNICATION SYSTEM AND APPARATUS THEREFOR

CROSS-REFERENCE TO RELATED APPLICATIONS

The present application is a continuation of U.S. application Ser. No. 16/815,602, filed on Mar. 11, 2020, now allowed, which is a continuation of International Application No. PCT/KR2019/001834, filed on Feb. 14, 2019, which claims the benefit of an earlier filing date and right of priority to U.S. Provisional Application No. 62/670,706, filed on May 11, 2018, U.S. Provisional Application 62/668, 791, filed on May 8, 2018, Korean Application No. 10-2018-0050945, filed on May 3, 2018, and U.S. Provisional Application No. 62/630,259, filed on Feb. 14, 2018. The disclosures of the prior applications are incorporated by reference in their entirety.

TECHNICAL FIELD

The present disclosure relates to a wireless communication system and, more particularly, to a method of determining a slot format including downlink, uplink, and/or flexible symbol(s) by a user equipment and/or a base station and an apparatus therefor.

BACKGROUND

Figure 1:
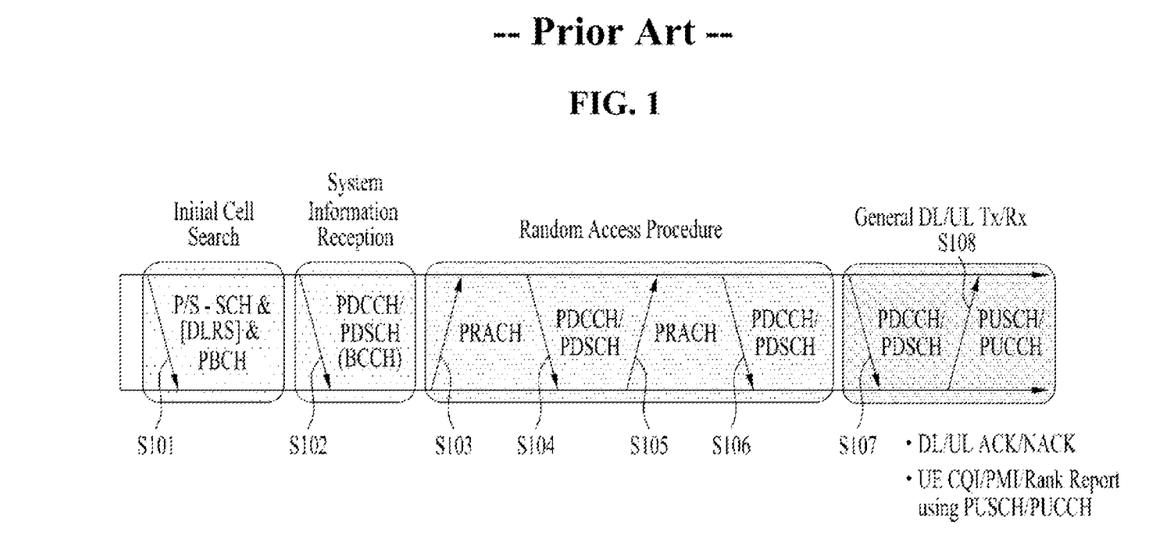
FIG. 1 illustrates physical channels used in a 3GPP LTE/LTE-A system and a normal signal transmission method using the physical channels.

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBS) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

SUMMARY

An object of the present disclosure is to provide a method of more accurately and efficiently determining a slot format by a UE and a BS and an apparatus therefor.

The objects of the present disclosure are not limited to what has been particularly described hereinabove and other objects not described herein will be more clearly understood from embodiments of the present disclosure.

One general aspect of the present disclosure includes a method performed by a user equipment (UE) in a wireless communication system, the method including: receiving, through higher layer signaling, uplink (UL)/downlink (DL) resource configuration including information regarding a first UL/DL resource pattern. The method also includes determining, based on the received UL/DL resource configuration, the first UL/DL resource pattern that is applicable over a first configuration period; and based on the received UL/DL resource configuration also including information regarding a second UL/DL resource pattern. The method also includes determining the second UL/DL resource pattern that is applicable over a second configuration period. The first configuration period and the second configuration period are restricted to values such that an integer multiple of a sum of the first configuration period and the second configuration period is time-aligned with a 20 ms time duration. Other embodiments of this aspect include corresponding computer systems, apparatus, and computer programs recorded on one or more computer storage devices, each configured to perform the actions of the methods.

Implementations may include one or more of the following features. The method where the first configuration period and the second configuration period are restricted to the values (0.5, 0.5), (0.5, 2), (0.625, 0.625), (1, 1), (1.25, 1.25), (2, 0.5), (2, 2), (5, 5), (5, 5), and (10, 10), where (x, y) indicates the first configuration period of x ms and the second configuration period of y ms. The method where the first configuration period is one of 0.5 ms, 0.625 ms, 1 ms, 1.25 ms, 2 ms, 2.5 ms, 5 ms, or 10 ms. The method where the second configuration period is one of 0.5 ms, 0.625 ms, 1 ms, 1.25 ms, 2 ms, 2.5 ms, 5 ms, or 10 ms. The method where the first configuration period and the second configuration period are restricted to the values such that the sum of the first configuration period and the second configuration period is a factor of 20 ms. The method further including: determining, based on the UL/DL resource configuration, (i) a first slot format to be applied over the first configuration period, and (ii) a second slot format to be applied over the second configuration period. The method further including: receiving first downlink control information (DCI) including first slot format related information (SFI) by periodically monitoring a group common (GC)-physical downlink control channel (PDCCH). The method may also include acquiring a slot format combination that is indicated by the first SFI, among slot format combinations of a slot format table that is preconfigured for the UE; and based on a duration of the slot format combination being greater than a monitoring periodicity of the GC-PDCCH: receiving second DCI including second SFI within the duration of the slot format combination. The method where the first SFI and the second SFI indicate a same slot format for a same slot. Implementations of the described techniques may include hardware, a method or process, or computer software on a computer-accessible medium.

Another general aspect of the present disclosure includes a method performed by a base station (BS) in a wireless communication system, the method including: determining a first uplink (UL)/downlink (DL) resource pattern that is applicable over a first configuration period. The method also includes transmitting, to a user equipment (UE) through higher layer signaling, a UL/DL resource configuration including information regarding the first UL/DL resource pattern. Based on the UL/DL resource configuration also including information regarding a second UL/DL resource pattern that is applicable over a second configuration period, the first configuration period and the second configuration period are restricted to values such that an integer multiple of a sum of the first configuration period and the second configuration period is time-aligned with a 20 ms time duration. Other embodiments of this aspect include corresponding computer systems, apparatus, and computer programs recorded on one or more computer storage devices, each configured to perform the actions of the methods.

Implementations may include one or more of the following features. The method where the first configuration period and the second configuration period are restricted to the values (0.5, 0.5), (0.5, 2), (0.625, 0.625), (1, 1), (1.25, 1.25), (2, 0.5), (2, 2), (2.5, 2.5), (5, 5), and (10, 10), where (x, y) indicates the first configuration period of x ms and the second configuration period of y ms. The method where the first configuration period is one of 0.5 ms, 0.625 ms, 1 ms, 1.25 ms, 2 ms, 2.5 ms, 5 ms, or 10 ms. The method may also include where the second configuration period is one of 0.5 ms, 0.625 ms, 1 ms, 1.25 ms, 2 ms, 2.5 ms, 5 ms, or 10 ms. The method where the first configuration period and the second configuration period are restricted to the values such that the sum of the first configuration period and the second configuration period is a factor of 20 ms. The method further including: determining a first slot format to be applied by the UE over the first configuration period. The method may also include determining a second slot format to be applied by the UE over the second configuration period. The method may also include determining the UL/DL resource configuration based on the first slot format and the second slot format. The method further including: transmitting, to the UE through a group common (GC)-physical downlink control channel (PDCCH), first downlink control information (DCI) including first slot format related information (SFI); and based on a duration of a slot format combination that is indicated by the first SFI being greater than a periodicity of the GC-PDCCH: transmitting, to the UE, second DCI including second SFI within the duration of the slot format combination. The method where the first SFI and the second SFI indicate a same slot format for a same slot. Implementations of the described techniques may include hardware, a method or process, or computer software on a computer-accessible medium.

Another general aspect of the present disclosure includes a user equipment (UE) configured to operate in a wireless communication system, the UE including: a transceiver. The user equipment also includes at least one processor; and at least one computer memory operably connectable to the at least one processor and storing instructions that, when executed by the at least one processor, perform operations including: receiving, through higher layer signaling via the transceiver, uplink (UL)/downlink (DL) resource configuration including information regarding a first UL/DL resource pattern. The operations also include determining, based on the received UL/DL resource configuration, the first UL/DL resource pattern that is applicable over a first configuration period; and based on the received UL/DL resource configuration also including information regarding a second UL/DL resource pattern. The operations also include determining the second UL/DL resource pattern that is applicable over a second configuration period. The first configuration period and the second configuration period are restricted to values such that an integer multiple of a sum of the first configuration period and the second configuration period is time-aligned with a 20 ms time duration. Other embodiments of this aspect include corresponding computer systems, apparatus, and computer programs recorded on one or more computer storage devices, each configured to perform the actions of the methods.

Another general aspect of the present disclosure includes a base station (BS) configured to operate in a wireless communication system, the BS including: a transceiver. The base station also includes at least one processor; and at least one computer memory operably connectable to the at least one processor and storing instructions that, when executed by the at least one processor, perform operations including: determining a first uplink (UL)/downlink (DL) resource pattern that is applicable over a first configuration period. The operations also include transmitting, to a user equipment (UE) through higher layer signaling via the transceiver, a UL/DL resource configuration including information regarding the first UL/DL resource pattern. Based on the UL/DL resource configuration also including information regarding a second UL/DL resource pattern that is applicable over a second configuration period, the first configuration period and the second configuration period are restricted to values such that an integer multiple of a sum of the first configuration period and the second configuration period is time-aligned with a 20 ms time duration.

Other embodiments of this aspect include corresponding computer systems, apparatus, and computer programs recorded on one or more computer storage devices, each configured to perform the actions of the methods.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

According to an embodiment of the present disclosure, when a plurality of uplink (UL)/downlink (DL) resource patterns is assigned to a UE through higher layer signaling, since the sum of periodicities of the assigned resource patterns is configured to be a predefined size, application of the resource patterns and time alignment related to a slot format may be clearly and efficiently performed.

It will be appreciated by persons skilled in the art that that the effects that can be achieved through the present disclosure are not limited to what has been particularly described hereinabove and other advantages of the present disclosure will be more clearly understood from the following detailed description.

DETAILED DESCRIPTIONS

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} * N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^{\mu} \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the ca se of extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc.

An REG may correspond to 1 OFDM symbol in the time domain and may correspond to 1 PRB in the frequency domain. In addition, 1 CCE may correspond to 6 REGs. The number of CCEs constituting one control channel candidate may differ according to an aggregation level (AL). For example, when the AL is N, the control channel candidate may include N CCEs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A BS may signal information about the CORESET to a UE. For example, a CORESET configuration for each CORESET may be signaled. As an example, at least one of a time duration (e.g., 1/2/3 symbols), a frequency-domain resource (e.g., an RB set), an REG-to-CCE mapping type (e.g., an interleaved or non-interleaved type), a precoding granularity, an REG bundling size (e.g., in the case of the interleaved mapping type), an interleaver size (e.g., in the case of the interleaved mapping type), or a demodulation reference signal (DMRS) configuration (e.g., a scrambling ID) may be signaled through the CORESET configuration. If interleaving for distributing a CCE to a 1-symbol CORESET is applied, bundling of 2 or 6 REGs may be performed. For a 2-symbol CORESET, bundling of 2 or 6 REGs may be performed and time-first mapping may be applied. For a 3-symbol CORESET, bundling of 3 or 6 REGs may be performed and time-first mapping may be applied. When REG bundling is performed, the UE may assume that the same precoding is applied to a corresponding bundling unit.

<The UE Operations Related to Slot Format>

Slot format related information (SFI) may be directly/ indirectly indicated through a group-common (GC) PDCCH (e.g., DCI format 2_0) and/or UE-specific DCI. A description which will be given hereinbelow is as follows. When the UE receives the SFI through the GC PDCCH and receives the SFI through the UE-specific DCI, a UE operation regarding which SFI a UE should conform to is defined. For example, a priority between the GC PDCCH and the UE-specific DCI may be configured. When the UE simultaneously includes two SFIs, which SFI the UE should conform to may be determined according to priority. In addition, an operation that may be performed by the UE when the reliability of the GC PDCCH and/or the UE-specific DCI is not sufficiently secured is defined. A relationship between the GC PDCCH and a semi-static configuration (e.g., DL/UL configuration information of each resource through RRC signaling) is also proposed.

A UE-specific SFI table may be configured per UE through higher layer signaling. For example, the SFI table may include a plurality of entries and each entry may indicate a combination of slot formats for a plurality of slots (e.g., a plurality of slots for a plurality of BWPs).

The GC PDCCH may indicate, to the UE, information (e.g., an index of an entry) as to in which entry a slot format is used in the UE-specific SFI table configured for the UE. The UE-specific SFI table may have slot formats for slot(s) of various numbers and the GC PDCCH may indicate slot formats which will be used for slot(s) of various numbers according to situation. The GC PDCCH may be transmitted with a predetermined periodicity. The number (or length) of slots indicated in the UE-specific SFI table may be the same as the periodicity of the GC PDCCH or a multiple of the periodicity of the GC PDCCH. Alternatively, the number (or length) of slots indicated in the UE-specific SFI table may not be the same as the periodicity of the GC PDCCH or may not be a multiple of the periodicity of the GC PDCCH.

For example, the periodicity of the GC PDCCH may be 4 slots and each entry of the UE-specific SFI table may include slot formats for 2, 4, 6, or 8 slots. Any entry of the UE-specific SFI table may be indicated by the GC PDCCH regardless of the periodicity of the GC PDCCH.

Slot Format Indication Less than GC PDCCH Periodicity

In this case, if the number of slot(s) for which slot formats are indicated through the GC PDCCH is not equal to the periodicity of the GC PDCCH or is not a multiple of the periodicity of the GC PDCCH, even though the UE has correctly received the GC PDCCH, a slot for which the slot format is not clearly defined may occur. For example, if the number of slots for which slot formats are indicated through the GC PDCCH is 2 but the periodicity of the GC PDCCH is 4 slots, slot formats for 2 slots among the 4 slots located within the periodicity of the GC PDCCH may not be clearly defined.

Thus, the following options may be considered as the operation of the UE for a slot for which a slot format is not clearly defined.

Option 1: The UE may regard a corresponding slot as 'Unknown'.

Option 2: The UE may regard a corresponding slot as 'Downlink'.

Option 3: The UE may perform 'an operation that the UE should conform to when the UE fails to normally detect the GC PDCCH although the UE should receive the GC PDCCH' with respect to a corresponding slot.

Option 4: The UE may determine that the GC PDCCH that causes a slot for which a slot format is not defined as described above is false.

Relationship Between GC PDCCH and Earlier GC PDCCH

In a situation in which a first GC PDCCH (e.g., first DCI format 2_0 through the GC PDCCH) indicates slot formats for slots longer than the periodicity thereof, a second GC PDCCH, a third GC PDCCH, and the like may indicate slot formats in the next GC PDCCH periodicity. In this case, slot(s) to which the slot formats indicated through the second GC PDCCH, the third GC PDCCH, and the like are applied may overlap with slot(s) to which the slot formats indicated through the first GC PDCCH are applied. This is simply represented as overlapping between slot formats. Thus, slot format indication for one slot may be received once or more times by the UE through different GC PDCCHs.

In this situation, the following options may be considered as the operation of the UE for a corresponding slot.

Option 1: The UE may always conform to slot formats of the most recently received GC PDCCH.

Option 2: The UE may conform to slot formats of an existing GC PDCCH (e.g., first GC PDCCH) with respect to slots prior to a slot at which slot format overlapping occurs and conform to slot formats indicated by a new GC PDCCH (e.g., second GC PDCCH) with respect to slots starting from the slot at which slot format overlapping occurs.

Option 3: In slots in which slot format overlapping occurs, if slot formats indicated by an existing GC PDCCH are different from slot formats indicated by a new GC PDCCH, the UE may recognize that the new GC PDCCH carries incorrect information. For example, a network always indicates the same slot format for the same slot.

As an example of Option 3, it is assumed that a monitoring periodicity of a PDCCH (e.g., GC PDCCH) for DCI format 2_0 has been configured for a specific search space set through higher layer signaling and the UE has acquired a combination of slot formats through an SFI index field value of DCI format 2_0. If the configured PDCCH monitoring periodicity is shorter than a duration of the slot format combination obtained by the UE, the UE may detect two or more of DCI format 2_0 indicating a slot format for one slot. In this situation, the UE may expect that the two or more of DCI format 2_0 detected for one slot will indicate the same slot format. In the same meaning, the network (or BS) may generate/transmit twice or more DCI format 2_0 indicating the slot format for the one slot and should generate/transmit DCI format 2_0 so as to indicate the same slot format for DCI format 2_0 for one slot.

Period Adjustment for Semi-Static D/U Configuration with Two Periods

The network may inform the UE of a bundle (pattern) of resource directions D, flexible, and/or U having a predetermined periodicity through semi-static D/U assignment (e.g., higher-layer parameter TDD-UL-DL-configuration).

The network may inform the UE of resource directions (e.g., a first pattern and a second pattern) for two periodicities (e.g., a first periodicity and a second periodicity) at a time through semi-static D/U assignment. For example, if two small periodicities constitute one large periodicity, a resource direction corresponding to the large periodicity (e.g., first pattern+second pattern) may be repeated. For convenience, the large periodicity is represented as a periodicity P.

Since a time of the periodicity P consists of a combination of two periodicities, there may be combinations of various time durations according to how two periodicities are selected.

For example, it is assumed that values usable as periodicity values when one periodicity is indicated through semi-static D/U assignment are {0.5, 0.625, 1, 1.25, 2, 2.5, 5, 10} ms. If two periodicities are indicated for semi-static D/U assignment, the two periodicities may be selected from among {0.5, 0.625, 1, 1.25, 2, 2.5, 5, 10} ms and selection of one value repeated twice may be permitted. The periodicity P may be determined based on the two periodicities selected in this way.

In this case, the periodicity P needs to be time-aligned with a predetermined unit time unit. This means that the predetermined time unit is divided by the periodicity P (i.e., without a remainder). The time unit may be, for example, $10*(2^n)$ ms such as 5 ms, 10 ms, 20 ms, or 40 ms. For convenience, the predetermined unit time for the periodicity P is represented as K ms. In this case, K ms may be an integer multiple of P (=first periodicity+second periodicity).

Alternatively, slot(s) to be included in the periodicity P need to match the predetermined number of unit slots. Examples of the predetermined number of unit slots may be $10*(2^n)$ slots such as 5 slots, 10 slots, 20 slots, or 40 slots. For convenience, the predetermined number of unit slots is represented as N-slot.

If it is desired to match the periodicity P to K ms or N-slot, the unit time/the number of unit slots may be aligned with the periodicity P (e.g., when K ms or N-slot is divided by the periodicity P without any remainder) but may not be aligned with the periodicity P. If the periodicity P is not time-aligned with K ms or N-slot, the following options may be considered to align semi-static D/U assignment with K ms or N-slot.

Option 1: The UE applies semi-static D/U assignment of a single periodicity or multiple periodicities P within K ms or N-slot. If the end of K ms or N-slot does not match the end of the periodicity P, the UE applies semi-static D/U assignment only up to a part matching the end of K ms or N-slot within the periodicity P.

Figure 2:
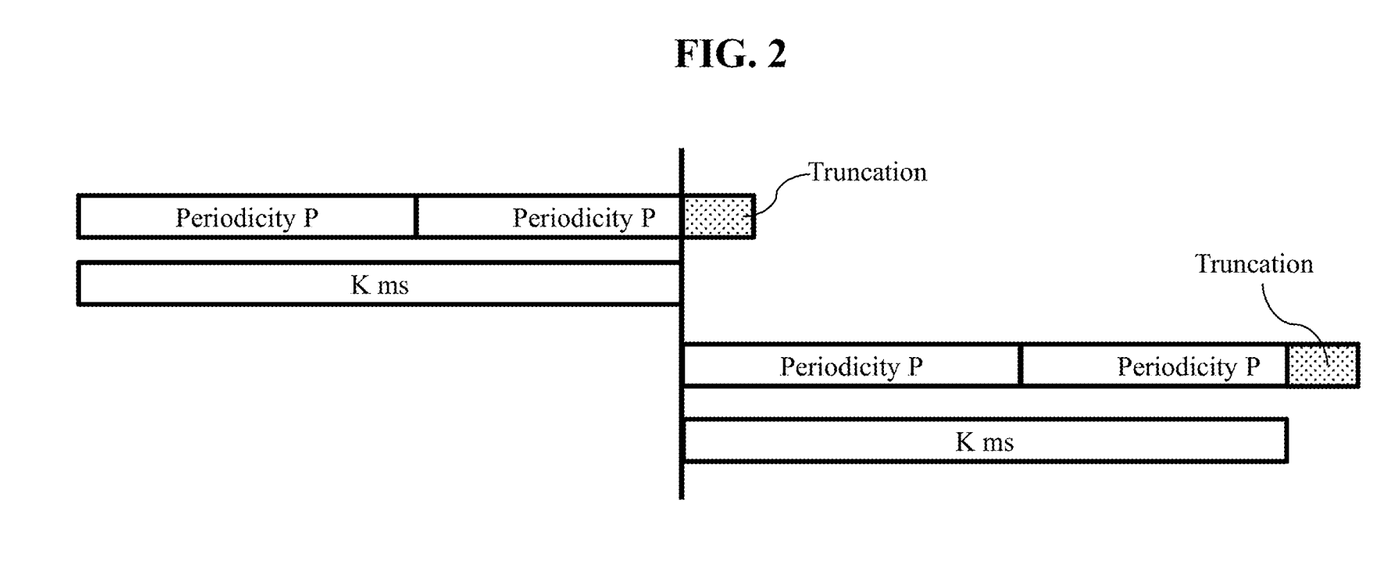
FIG. 2 illustrates truncation of semi-static D/U assignment according to an embodiment of the present disclosure.

FIG. 2 illustrates the case in which K ms is used in Option 1 and the UE truncates semi-static D/U assignment of the last periodicity P based on K ms.

Figure 3:
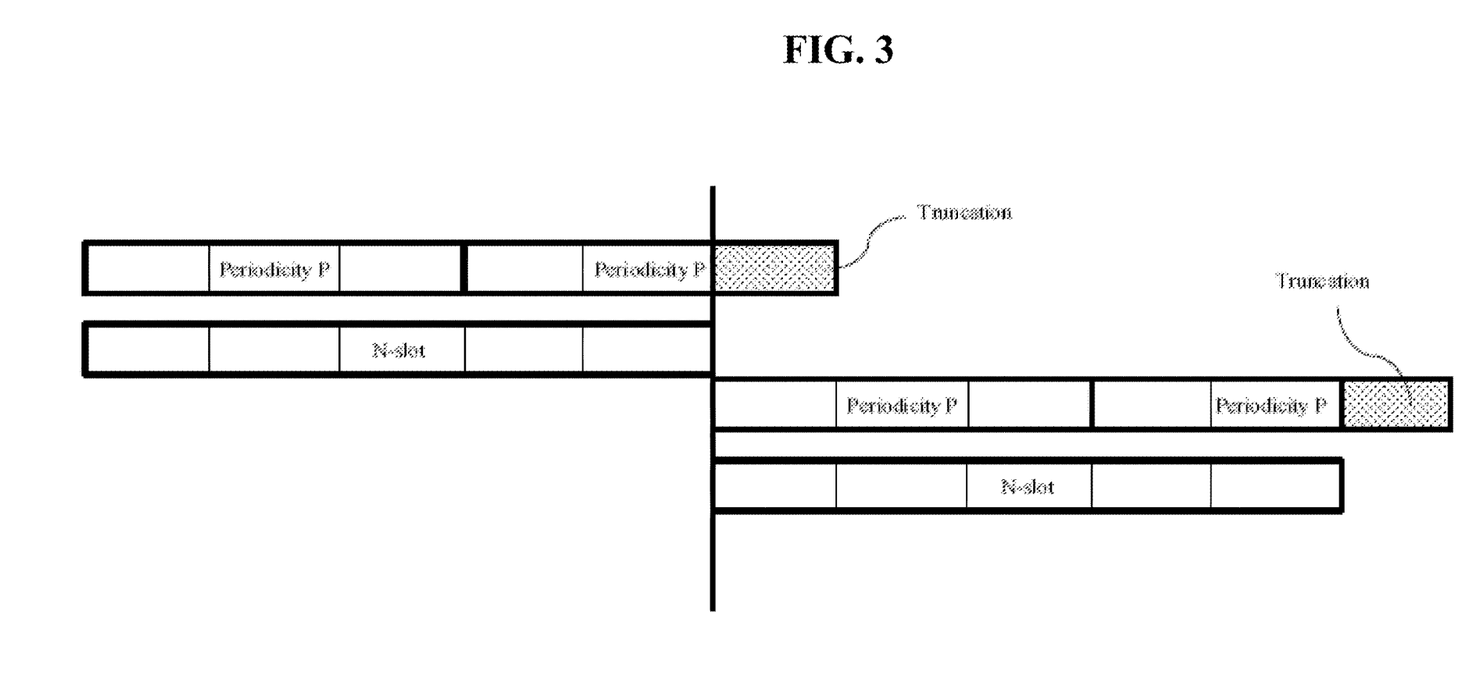
FIG. 3 illustrates truncation of semi-static D/U assignment according to another embodiment of the present disclosure.

FIG. 3 illustrates the case in which N-slot is used in Option 1 and the UE truncates semi-static D/U assignment of the periodicity P based on N-slot.

Option 2: K ms may be defined to be always time-aligned with the periodicity P. As mentioned above, K ms may be predefined as a value satisfying $10*(2^n)$ ms such as 5 ms, 10 ms, 20 ms, or 40 ms. In this case, in determining the first periodicity and the second periodicity constituting the periodicity P, the network may determine the first periodicity and the second periodicity such that a combination of the first periodicity and the second periodicity may be time-aligned with K ms.

Alternatively, N-slot may be defined to be always aligned with the periodicity P. As mentioned above, one of values satisfying $10*(2^n)$ slots such as 5 slots, 10 slots, 20 slots, or 40 slots may be used as N-slot.

In addition to the above-mentioned values, K-ms or N-slot which is equal to the periodicity P or a multiple of the periodicity P may be newly defined so that K ms and/or N-slot may be divided by the periodicity P without any remainder.

Option 3: In addition to Option 2, the periodicity P may be defined such that only the periodicity P matching K ms (e.g., $10*(2^n)$ ms such as 5 ms, 10 ms, 20 ms, or 40 ms) and/or N-slot (e.g., $10*(2^n)$ slots such as 5 slots, 10 slots, 20 slots, or 40 slots) is used.

Detail Conditions for DL/UL Cancellation

An RRC configuration may be cancelled or an operation based on RRC configuration may be confirmed, through a slot format carried over a GC PDCCH.

When the UE determines whether to perform the operation based on RRC configuration, there is no problem if the UE is previously aware of information about the GC PDCCH. However, if an RRC configuration resource is equal to or approximates to a resource on which the GC PDCCH should be transmitted, a decoding processing time of the GC PDCCH may be problematic when the UE determines whether to perform or cancel the operation based on RRC configuration. The network should consider the decoding processing time of the GC PDCCH. For example, the UE may be clearly aware of whether to perform the operation based on RRC configuration only when the GC PDCCH has been perfectly decoded. This is because the UE may need to be in a standby state during the decoding time.

A DL operation based on RRC configuration may include, for example, CORESET monitoring and CSI-RS measurement and the present disclosure is not limited thereto.

During CORESET monitoring, a PDCCH different from the GC PDCCH (e.g., a PDCCH carrying a DCI format different from a DCI format of the GC PDCCH) may be received on the same CORESET. If decoding for the GC PDCCH is not ended so that the UE is not aware of a slot format for the entire CORESET yet, the UE may blind-decode other PDCCHs as well as the GC PDCCH. Next, if the UE is aware that a CORESET region in which other PDCCHs may be transmitted has been cancelled due to the GC PDCCH, the UE may drop (or discard) a blind decoding result for other PDCCHs for which the UE has performed blind decoding.

CSI-RS measurement will now be described. When the GC PDCCH and a CSI-RS are located in the same symbol or the CSI-RS is located within a decoding time of the GC PDCCH, the UE should determine whether the CSI-RS has been received. In this case, the following two cases may be considered.

Case 1: the UE performs measurement for a single CSI-RS and reports only a measurement result for the single CSI-RS to the BS.

Case 2: the UE accumulates measurement result(s) for CSI-RS(s) and reports the accumulated result to the BS.

In a situation of Case 1, the UE may perform CSI measurement but may drop (or discard) a CSI measurement value if CSI-RS reception is cancelled due to the GC PDCCH.

In a situation of Case 2, the UE may not perform CSI measurement before the UE perfectly decodes the GC PDCCH. This serves to prevent an incorrect CSI measurement value from being accumulated.

Figure 4A:
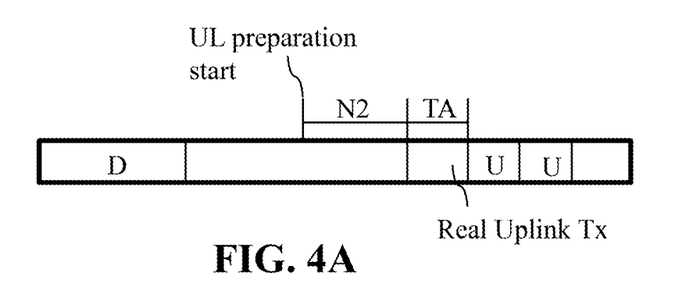
FIGS. 4A and 4B illustrate a time at which UL RRC configuration cancellation is accepted, in consideration of a PUSCH preparation time (i.e., N2) and timing advance (TA), according to an embodiment of the present disclosure.
Figure 4B:
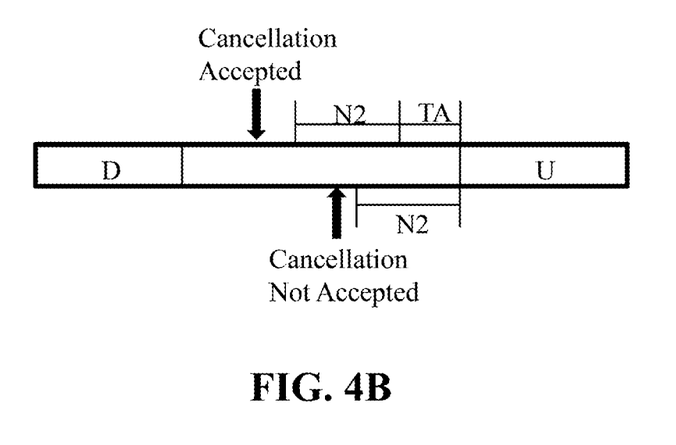

FIGS. 4A and 4B illustrate a time at which UL RRC configuration cancellation is accepted, in consideration of a PUSCH preparation time (i.e., N2) and timing advance (TA), according to an embodiment of the present disclosure.

In order for the network to cancel the operation based on the UL RRC configuration, UL cancellation through the GC PDCCH should be indicated prior to at least N2 (e.g., a PUSCH preparation time of TS 38.214 of 3GPP standard specification). This is because the network cannot cancel the operation of the UE after a time at which the UE starts to prepare UL transmission (e.g., refer to FIG. 4A). In this case, since the UE prepares UL transmission in consideration of even a TA in addition to N2, the UE prepares UL transmission at a timing earlier by an N2+TA time than a UL resource based on a slot format. Therefore, cancellation for the operation based on UL RRC configuration should be indicated prior to the N2+TA time. For example, cancellation for UL RRC configuration should be indicated (or decoding of the GC PDCCH should be ended) prior to the N2+TA time starting from a resource indicated as UL.

Priority Between RRC Configurations

Usage of a resource may be set through an RRC signal. In this case, two or more RRC configurations may be set for the same resource. Therefore, a priority between the RRC configurations and/or an operation of the UE related thereto needs to be defined.

Particularly, as a result of setting a plurality of RRC configurations for the same resource, resource directions may collide between the RRC configurations. For example, when an RRC configuration corresponding to DL and an RRC configuration corresponding to UL are simultaneously set for the same resource, a problem may occur.

A DL related RRC configuration may include, for example, (i) a periodic/semi-persistent CSI-RS for a CSI report, (ii) a CSI-RS for a TRS, and/or (iii) a CSI-RS for radio resource management (RRM), but the present disclosure is not limited thereto.

A UL related RRC configuration may include, for example, (i) a periodic CSI report, (ii) a periodic/semi-persistent sounding reference signal (SRS), (iii) a contention-free RACH resource, (iv) a grant-free resource, and/or (v) an SR resource, but the present disclosure is not limited thereto.

The priority between RRC configurations when such DL/UL RRC configurations are set for the same resource or additional UE operations may be defined as follows.

(1) UE does not Expect Overlapped Configuration

The UE may assume that two or more RRC configurations cannot be set for the same resource. If the two or more RRC configurations are set for the same resource, the UE may regard the two or more RRC configurations as errors and disregard the two or more RRC configurations.

(2) Follow the Latest or First Configuration

When the two or more RRC configurations are set for the same resource, the UE may operate according to the following options.

Option 1: The UE conforms to the first received RRC configuration.

Option 2: The UE conforms to the latest received RRC configuration.

An option that the UE will conform to may be predefined or an option that the UE should conform to may be indicated through higher layer signaling.

(3) Relationship Between Configuration for Downlink and Configuration for Uplink Upon simultaneously receiving an RRC configuration corresponding to DL and an RRC configuration corresponding to UL for the same resource, the UE may operate according to the following options.

Option 1: The UE conforms to the RRC configuration corresponding to DL.

Option 2: The UE conforms to the RRC configuration corresponding to UL.

Option 3: The UE does not perform any operation corresponding to the RRC configuration on a corresponding resource.

An option that the UE will conform to may be predefined or an option that the UE should conform to may be indicated through higher layer signaling.

UE Behavior when UE does not Try to Decode GC PDCCH

In a beam failure recovery (BFR) situation, the UE first blind-decodes search spaces within a CORESET (hereinafter, BFR CORESET) for receiving a BFR related PDCCH signal. Since a monitoring priority of the BFR CORESET is the highest, the UE blind-decodes search spaces within other CORESETs after blind-decoding search spaces of the BFR CORESET.

Meanwhile, in performing blind decoding, a channel estimation limitation may be present per UE. It may be difficult to monitor other CORESETs if the UE reaches the channel estimation limitation in a process of performing blind decoding for search spaces within the BFR CORESET. Alternatively, even if the UE does not reach the channel estimation limitation in a process of performing blind decoding for search spaces within the BFR CORESET so that the UE performs blind decoding for partial search spaces within other CORESETs, since the UE should selectively blind-decode search spaces, the case in which blind decoding may not be performed for search spaces for the GC PDCCH may occur.

The case in which the UE cannot attempt to perform blind decoding itself for the GC PDCCH due to this cause needs to be differently treated from the case in which the UE fails to detect the GC PDCCH although the UE has performed blind decoding in order to receive the GC PDCCH. The operation of the UE when the UE has not performed blind decoding itself for the GC PDCCH and thus fails to acquire dynamic SFI (e.g., DCI format 2_0) needs to be defined.

- Option 1: The UE conforms to an operation when the UE performed blind decoding for the GC PDCCH but failed to receive the GC PDCCH.
- Option 2: The UE performs at least an operation defined or activated by semi-static D/U assignment. The UE does not perform RRC configuration related operations present in semi-static 'flexible' but performs CORESET monitoring. If the UE decodes DCI other than the GC PDCCH as the result of CORESET monitoring, the UE conforms to information of the DCI.
- Option 3: The UE may perform an operation in the case in which monitoring for the GC PDCCH is not configured.
- Option 4: The UE performs only an operation defined or activated by the DCI other than semi-static D/U assignment, an RRC configuration, and the GC PDCCH.
- Option 5: The UE performs RRC configuration related operations and other DL or UL related operations only on a resource for which a direction is clearly defined as D or U by semi-static D/U assignment.
- Option 6: The UE performs RRC configuration related operations and other DL or UL related operations even on a resource corresponding to 'flexible' in addition to a resource for which a direction is clearly defined as D or U by semi-static D/U assignment.

Figure 5:
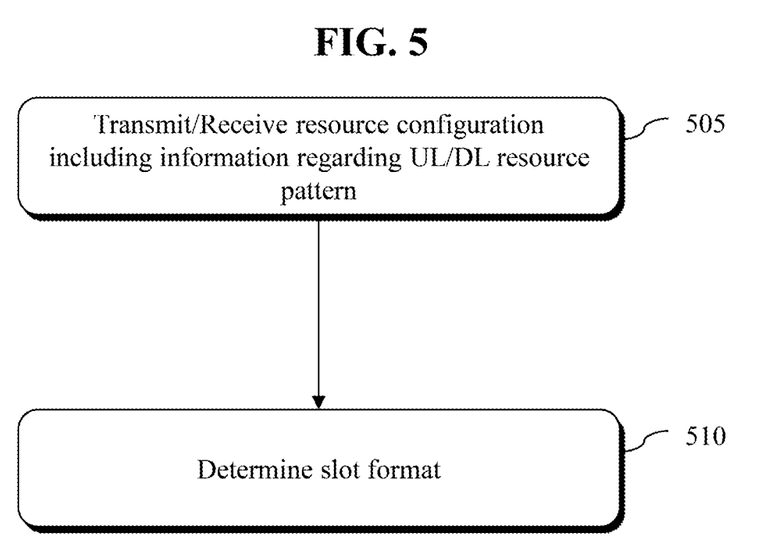
FIG. 5 illustrates a flow of a slot format determination method according to an embodiment of the present disclosure.

FIG. 5 illustrates a flow of a slot format determination method according to an embodiment of the present disclosure. FIG. 5 illustrates exemplary implementation of the above-described embodiments. The present disclosure is not limited to FIG. 5 and a repeated description as compared with the above description may be omitted.

Referring to FIG. 5, the UE/BS may receive/transmit a resource configuration including information about at least one UL/DL resource pattern through higher layer signaling (505).

The UE/BS may determine a slot format which is to be applied to each specific periodicity based on the resource configuration (510).

If the resource configuration includes information about a plurality of UL/DL resource patterns, the specific periodicity may be determined through a combination of a first periodicity related to a first UL/DL pattern among a plurality of UL/DL resource patterns and a second periodicity related to a second UL/DL pattern among the UL/DL resource patterns and an integer multiple of the specific periodicity may be time-aligned with a predefined time length.

The predefined time length may be 20 ms and the integer multiple of the specific periodicity may be 20 ms.

The first periodicity may be 0.5 ms, 0.625 ms, 1 ms, 1.25 ms, 2 ms, 2.5 ms, 5 ms, or 10 ms. The second periodicity may be 0.5 ms, 0.625 ms, 1 ms, 1.25 ms, 2 ms, 2.5 ms, 5 ms, or 10 ms. The specific periodicity may be the sum of the first periodicity and the second periodicity. The combination of the first periodicity and the second periodicity may be determined such that the sum of the first periodicity and the second periodicity is a factor of 20 ms.

In particular, the value of the first periodicity and the value of second periodicity, represented as the pair (x, y) where x is the value (in ms) of the first periodicity and y is the value (in ms) of the second periodicity, may be equal to (0.5, 0.5), (0.5, 2), (0.625, 0.625), (1, 1), (1.25, 1.25), (2, 0.5), (2, 2), (5, 5), (5, 5), and (10, 10), such that the sum of x and y is a factor of 20 ms.

The UE may receive first DCI including first SFI by periodically monitoring a GC-PDCCH. The BS may transmit the first DCI including the first SFI through the GC PDCCH. The UE may acquire a slot format combination indicated by the first SFI among slot format combinations of a preconfigured slot format table. If a duration of the slot format combination indicated by the first SFI is longer than a monitoring periodicity of the GC-PDCCH, the UE/BS may receive/transmit second DCI including second SFI within the duration of the slot format combination indicated by the first SFI. The first SFI and the second SFI may indicate the same slot format for the same slot.

Figure 6:
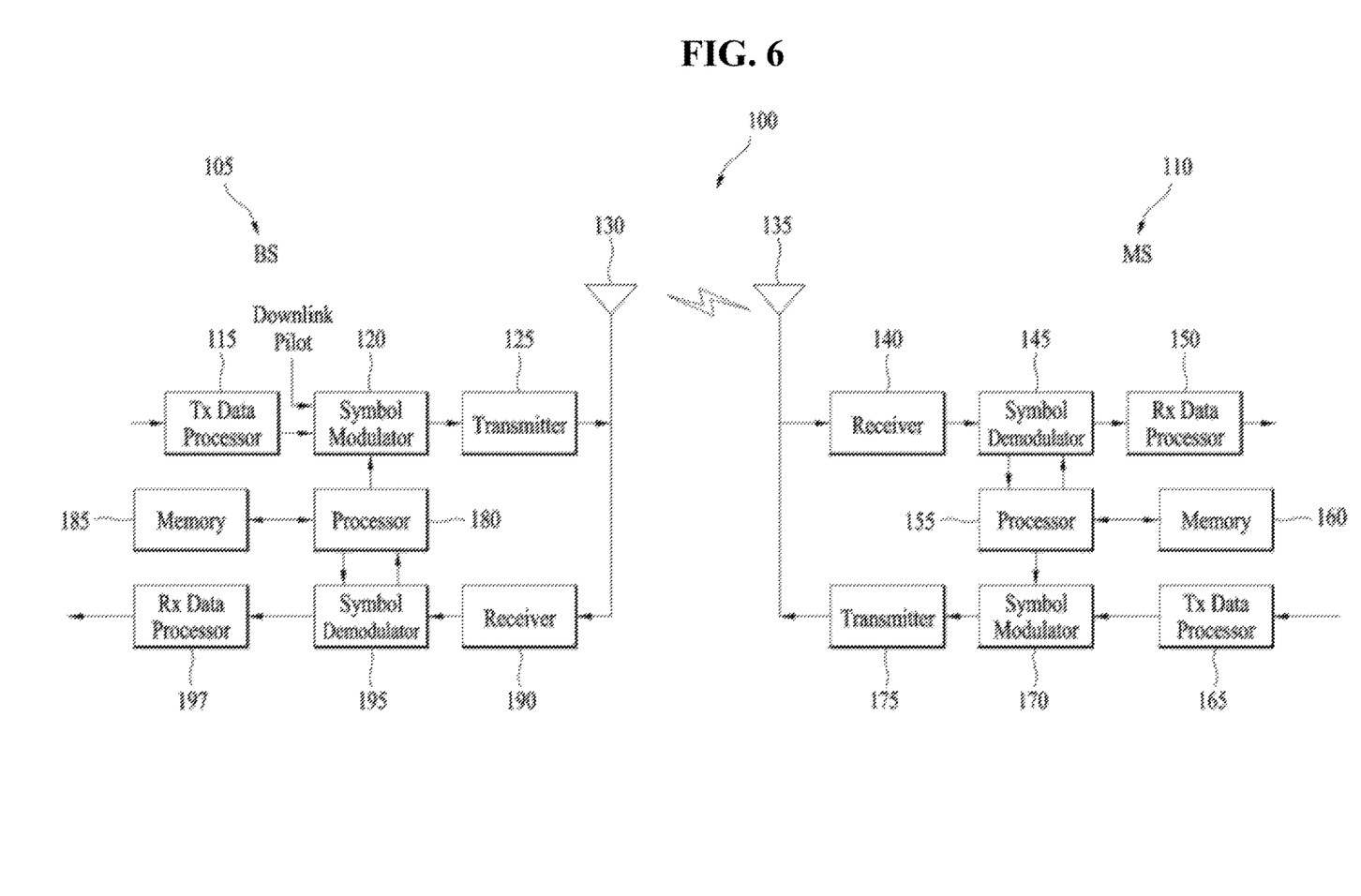
FIG. 6 illustrates user equipment and a base station according to one embodiment of the present disclosure.

FIG. 6 is a block diagram illustrating a structure of a base station (BS) 105 and a UE 110 in a wireless communication system 100 according to an embodiment of the present disclosure. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 6, although one antenna 130 is shown for the BS 105 and one antenna 135 is shown for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present disclosure may be implemented in the form of modules, procedures, functions, etc. which perform the above-described functions or operations. Firmware or software implemented in the present disclosure may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

As described above, the present disclosure may be applied to various wireless communication systems.

What is claimed is:

1. A method of receiving slot format information (SFI) by a user equipment (UE) in a wireless communication system, the method comprising:

receiving, based on a monitoring periodicity, a first group common-physical downlink control channel (GC-PDCCH) signal including first SFI for first slots; and receiving, based on the monitoring periodicity, a second GC-PDCCH signal including second SFI for second slots, wherein, based on that a time duration of the first slots is longer than monitoring periodicity, and a slot of the second slots overlaps with the first slots; the UE determines that, for the overlapping slot, a slot format to be configured through the second SFI is identical to a slot format configured through the first SFI.

2. The method according to claim 1, wherein the UE is configured with a plurality of slot format combinations, and wherein each SFI indicates each slot format combination from among the plurality of slot format combinations.

3. The method according to claim 1, further comprising:

receiving, through higher layer signaling, uplink (UL)/downlink (DL) resource configuration comprising information regarding a plurality of UL/DL resource patterns including a first UL/DL resource pattern with a first periodicity and a second UL/DL resource pattern with a second periodicity; and obtaining, based on the received UL/DL resource configuration, a specific UL/DL resource pattern with a specific periodicity in which the first UL/DL resource pattern and the second UL/DL resource pattern are combined, wherein the UE periodically repeats the specific UL/DL resource pattern for N times per 20 ms, where 'N' is an integer that satisfies a formula 20 ms/P, and 'P' denotes a time length of the specific periodicity.

4. The method according to claim 1, further comprising:

receiving, through higher layer signaling, uplink (UL)/downlink (DL) resource configuration which indicates a specific resource as flexible, wherein, in an absence of a third GC-PDCCH signal including SFI for the specific resource indicated as flexible by the semi-static UL-DL resource configuration, the UE does not perform an uplink transmission in the specific resource even though the uplink transmission has been configured in the specific resource through a radio resource control (RRC) configuration.

5. The method according to claim 1, further comprising:

receiving a radio resource control (RRC) configuration indicating an uplink transmission for a specific resource;

determining whether to perform the uplink transmission based on physical uplink shared channel (PUSCH) preparation time and a corresponding GC-PDCCH signal for the specific resource.

6. The method according to claim 5, wherein the UE determines to cancel the uplink transmission based on that the corresponding GC-PDCCH signal is received before a certain time point preceding a start of the specific resource, wherein a difference between the certain time point and the start of the resource is equal to a sum of the PUSCH preparation time (N2) and a timing advance time (TA).

7. The method according to claim 5, wherein the UE determines to perform the uplink transmission based on that the corresponding GC-PDCCH signal is received after a certain time point preceding a start of the specific resource, wherein a difference between the certain time point and the start of the resource is equal to a sum of the PUSCH preparation time (N2) and a timing advance time (TA).

8. A non-transitory medium recorded thereon instructions for executing the method according to claim 1.

9. The method of claim 1, wherein the second GC-PDCCH is a subsequent GC-PDCCH to the first GC-PDCCH.

10. A device for wireless communication, the device comprising:

a memory configured to store instructions; and a processor configured to perform operations by executing the instructions, the operations comprising:

receiving, based on a monitoring periodicity, a first group common-physical downlink control channel (GC-PDCCH) signal including first slot format information (SFI) for first slots; and receiving, based on the monitoring periodicity, a second GC-PDCCH signal including second SFI for second slots, wherein, based on that a time duration of the first slots is longer than monitoring periodicity, and a slot of the second slots overlaps with the first slots, the processor is configured to determine that, for the overlapping slot, a slot format to be configured through the second SFI is identical to a slot format configured through the first SFI.

11. The device according to claim 10, further comprising:

a transceiver configured to transmit or receive a wireless signal under control of the processor, wherein the device is an user equipment (UE) configured to operate in a 3rd generation partnership project (3GPP)-based wireless communication system.

12. A method of transmitting slot format information (SFI) by a base station (BS) in a wireless communication system, the method comprising:

transmitting, based on a group common-physical downlink control channel (GC-PDCCH) periodicity, a first GC-PDCCH signal including first SFI for first slots; and transmitting, based on the GC-PDCCH periodicity, a second GC-PDCCH signal including second SFI for second slots, wherein, based on that a time duration of the first slots is longer than the GC-PDCCH periodicity, and a slot of the second slots overlaps with the first slots, the BS is configured to determine that, for the overlapping slot, a slot format to be signaled through the second SFI is identical to a slot format signaled through the first SFI.

13. The method according to claim 12, wherein the BS configures a plurality of slot format combinations, and wherein each SFI indicates each slot format combination from among the plurality of slot format combinations.

14. The method according to claim 12, further comprising:

transmitting, through higher layer signaling, uplink (UL)/downlink (DL) resource configuration comprising information regarding a plurality of UL/DL resource patterns including a first UL/DL resource pattern with a first periodicity and a second UL/DL resource pattern with a second periodicity wherein the first UL/DL resource pattern and the second UL/DL resource pattern are combined as a specific UL/DL resource pattern with a specific periodicity, and wherein the specific UL/DL resource pattern periodically repeated for N times per 20 ms, where 'N' is an integer that satisfies a formula 20 ms/P, and 'P' denotes a time length of the specific periodicity.

15. A non-transitory medium recorded thereon instructions for executing the method according to claim 12.

16. A base station (BS) comprising:
a transceiver; and
a processor configured to control the transceiver,
wherein the processor is configured to transmit, based on a group common-physical downlink control channel (GC-PDCCH) periodicity, a first GC-PDCCH signal including first SFI for first slots, and to transmit, based on the GC-PDCCH periodicity, a second GC-PDCCH signal including second SFI for second slots, and
wherein, based on that a time duration of the first slots is longer than the GC-PDCCH periodicity, and a slot of the second slots overlaps with the first slots, the processor is configured to determine that, for the overlapping slot, a slot format to be signaled through the second SFI is identical to a slot format signaled through the first SFI.

* * * * *